3,541,168
Patented Nov. 17, 1970

3,541,168
ISOMERIZATION OF 3-BROMO-1-PROPYNES
Chester E. Pawloski, Bay City, and Russell L. Stewart, Midland, Mich., assignors to The Dow Chemical Company, Midland, Mich., a corporation of Delaware
No Drawing. Filed Mar. 27, 1968, Ser. No. 716,332
Int. Cl. C07c 21/02; A01n
U.S. Cl. 260—654        10 Claims

ABSTRACT OF THE DISCLOSURE 3-bromo-1-propynes having the formula $$HC \equiv C - CR_2Br$$

are isomerized to their corresponding 1-bromo-1,2-propadienes having the formula $$HBrC = C = CR_2$$

where each R independently is H or alkyl having up to four carbon atoms, by a process which comprises contacting the 3-bromo-1-propyne in the liquid phase with an amido catalyst at a temperature between 80 and 150° C. It is preferred to conduct the reaction in the presence of a catalytic amount of a metal halide. The 1-bromo-1,2-propadiene products produced by this reaction have biological activity.

BACKGROUND OF THE INVENTION

It is known that bromopropadiene is produced by an isomerization reaction involving liquid contacting propargyl bromide with cuprous bromide. See Jacobs and Brill, J. Amer. Chem. Soc., 75, 1314 (1953). By this process, a distillation of several days is necessary to obtain a 98% pure product. If the distillation time is shortened, e.g. to 24 hours, the product purity decreases to 75–85% with a yield of 84%.

SUMMARY OF THE INVENTION

It has now been found that 3-bromo-1-propynes having the formula $$HC \equiv C - CR_2Br$$

are isomerized to their corresponding 1-bromo-1,2-propadienes having the formula $$HBrC = C = CR_2$$

where each R independently is H or alkyl having up to four carbon atoms, preferably methyl, by a process which comprises contacting the 3-bromo-1-propyne in the liquid phase with an amido catalyst at a temperature between 80 and 150° C. Although not necessary to the invention, it is preferred to conduct this isomerization reaction in the presence of a metal halide. By producing 1-bromo-1,2-propadienes in this manner, the reaction times are much shorter than has heretofore been possible and the yields are high.

In order to practice this invention, the 3-bromo-1-propyne to be isomerized is contacted in the liquid phase, in any convenient manner, with an amido catalyst at a temperature between 80 and 150° C. A preferred method of operation is a continuous method wherein the vaporous products of the reaction are distilled and the 1-bromo-1,2-propadiene product separated therefrom while the liquid isomerization reaction is occurring. Of course, a batch process can also be employed.

Specific 3-bromo-1-propynes that are isomerized by this process to their corresponding 1-bromo-1,2-propadienes include 3-bromo-1-propyne (propargyl bromide), 3-bromo-3,3-dimethyl-1-propyne, 3-bromo-3,3-diethyl-1-propyne, 3-bromo-3-ethyl-3-propyl-1-propyne, 3-bromo-3-methyl-3-n-butyl-1-propyne, and in general, the 3-bromo-3,3-dialkyl-1-proypnes where each alkyl independently has up to four carbon atoms. Other 3-bromo-1-propynes isomerized to their corresponding 1-bromo-1,2-propadienes at somewhat lower yields include 3-bromo-1-butyne, 3-bromo-1-pentyne, 3-bromo-1-heptyne and in general, the 3-bromo-3-alkyl-1-propynes where alkyl has up to four carbon atoms.

The amido catalysts useful in this invention are those having the formula

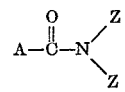

where each Z independently is a hydrocarbon radical having up to six carbon atoms and A is H or a hydrocarbon radical having up to six carbon atoms. Thus, specific amido catalysts employed in this invention are N,N-dimethylformamide; N-methyl-N-ethylformamide; N,N-di-n-hexylformamide; N-ethyl-N-isobutylformamide; N-phenyl-N-propylformamide; N,N-diphenylformamide; and in general, the N,N-dialkylformamides, N,N-diarylformamides and the N-alkyl-N-arylformamides where each alkyl and aryl independently has up to six carbon atoms. Other specific amido catalysts include N,N-dimethylacetamide; N-methyl-N-ethylbutyramide; N,N-diphenylbenzamide; N,N-dimethylbenzamide; N-methyl-N-phenylcapramide; N-ethyl-N-phenylbenzamide; N,N-dimethylcaprylamide; and in general, the N,N-dialkylalkanoylamides, the N,N-diarylalkanolyamides, the N,N-dialkylaroylamides, the N,N-diarylaroylamides, the N-alkyl-N-arylalkaroylamides and the N-alkyl-N-arylaroylamides where each alkyl, aryl, alkanoyl and aroyl group independently has up to six carbon atoms. The ratio of amido catalyst to 3-bromo-1-propyne is not critical to this invention, but it is preferred to use a volume ratio of amido catalyst to 3-bromo-1-propyne of greater than 1:2; most preferably this ratio is between 1:2 and 5:1.

As was previously indicated, it is preferred to conduct this isomerization reaction in the presence of a catalytic amount of a metal halide. These metal halides are catalyst promoters. Suitable metal halides include the halide, i.e., fluoride, chloride, bromide and iodide, salts of the alkali metals, calcium, magnesium and copper. Specific examples of useful metal halides are lithium fluoride, sodium chloride, potassium bromide, rudibium iodide, cesium fluoride, calcium bromide, magnesium chloride, cuprous iodide, sodium bromide, potassium chloride, cuprous chloride, cuprous bromide and calcium chloride. Of course, mixtures of these metal halides can also be employed, e.g. a sodium bromide and sodium chloride mixture is effective.

In order to isomerize the 3-bromo-1-propynes, the temperature is suitably between 80 and 150° C. and preferably between 80 and 130° C. Most preferably, this temperature is between 100 and 120° C. The preferred pressure is between 300 mm. Hg and one atmosphere, but pressures below 300 mm. and above one atmosphere can suitably be employed.

The 1-bromo-1,2-propadienes produced by this process have biological activity. For example, 1-bromo-1,2-propadiene (bromoallene), which is the isomerization product of 3-bromo-1-propyne (propargyl bromide), is an active nematocide and is active entomologically. For example, 0.1 ml. of a solution of 12 parts per million of bromoallene in acetone was placed in a jar containing moist sandy loam soil infested with rootknot nematode. The jar was immediately capped and held at 65–75° F. for 7 days. Following this, the cap was removed and the soil was aerated for 7 days. Cucumbers were then planted in this soil and in a soil blank (i.e. moist sandy loam soil not treated with bromoallene) and allowed to grow in a greenhouse until cucumbers which had been planted in soil not treated with bromoallene had roots which were well galled. At this time the roots of cucumbers grown in bromoallene-treated soil were not galled.

Entomological activity is demonstrated by the following experiment, 7 mg. of larval Black Carpet beetles were placed in a perforated cage which, in turn, was placed in a 25.5 liter vault. Air was drawn across the vault and maintained for 16 hours at 80° F. with bromoallene injected into the entering air stream so that 3 pounds of bromoallene per 1000 cubic feet of air was present. After 16 hours, 100% kill of the beetles was observed.

DESCRIPTION OF SPECIFIC EMBODIMENT

Example 1

15 g. of propargyl bromide and 35 g. of dimethylformamide were placed into a 250 ml. flask equipped with a 30 inch, 1 inch I.D. distillation column. The reactants were heated until the pot temperature reached 150° C. and the head temperature was 132° C. The material was then slowly distilled. The crude product (distillate), 15 g., was washed with water and analyzed by VPC and I.R. to show a 23% conversion to bromoallene.

The identical experiment was repeated with trace amounts of sodium bromide and sodium chloride present in the flask. VPC and I.R. analysis showed 66% conversion of propargyl bromide to bromoallene. Each experiment was complete in sixty minutes.

Example 2

In a series of experiments, propargyl bromide and dimethylformamide, together with trace amounts of sodium bromide and sodium chloride were placed in a 500 ml. flask equipped with a 24 inch, 1 inch I.D. distillation column packed with ¼ inch glass beads and having a fractionating distillation head with an ice trap. The reactants were then distilled. Each cut was taken at the specified temperature and pressure, as is the amount of distillate taken at each cut. The amount of reactant, bromoallene product, yields and conversions are reported below. Each run was complete in less than six hours.

TABLE I

Propargyl bromide 115 g.
Dimethylformamide 237.5 g.

| Cut No. | Temperature (° C.) Pot | Temperature (° C.) Head | Pressure, mm. Hg | Amount of cut, g. | Percent bromoallene in cut (VPC analysis) |
|---|---|---|---|---|---|
| 0 | 132 | 72 | 760 | | |
| 1 | 143 | 71 | 760 | 28 | 98 |
| 2 | 148 | 71 | 760 | 32 | 95 |

Note.—Overall 50% yield of bromoallene obtained from 98% conversion of propargyl bromide.

Propargyl bromide 300 g.
Dimethylformamide 200 g.

| Cut No. | Temperature (° C.) Pot | Temperature (° C.) Head | Pressure, mm. Hg | Amount of cut, g. | Percent bromoallene in cut (VPC analysis) |
|---|---|---|---|---|---|
| 0 | 107 | 67 | 760 | | |
| 1 | 108 | 70 | 760 | 23 | 60 |
| 2 | 110 | 72 | 760 | 40 | 90 |
| 3 | 115 | 72 | 760 | 42 | 98 |
| 4 | 110 | 52 | 350 | 26 | 98 |
| 5 | 120 | 44 | 420 | 50 | 95 |
| 6 | 125 | 68 | 285 | 37 | 80 |
| Ice trap | | | | 48 | 85 |

Note.—Overall 85% yield of bromoallene obtained from 96% conversion of propargyl bromide.

Propargyl bromide 540 g.
Dimethylformamide 300 g.

| Cut No. | Temperature (° C.) Pot | Temperature (° C.) Head | Pressure, mm. Hg | Amount of cut, g. | Percent bromoallene in cut (VPC analysis) |
|---|---|---|---|---|---|
| 1 | 103 | 73 | 760 | 24 | 75 |
| 2 | 103 | 73 | 760 | 58 | 75 |
| 3 | 113 | 72 | 760 | 79 | 90 |
| 4 | 127 | 72 | 760 | 132 | 97 |
| 5 | 130 | 67 | 700 | 46 | 98 |
| 6 | 133 | 107 | 330 | 122 | 85 |

Note.—Overall 82% yield of bromoallene obtained from 92% conversion of propargyl bromide.

We claim:

1. A process for isomerizing a 3-bromo-1-propyne having the formula $$HC{\equiv}C{-}CR_2Br$$

to the corresponding 1-bromo-1,2-propadiene having the formula $$HBrC{=}C{=}CR_2$$

by a process which comprises, contacting the 3-bromo-1-propyne in the liquid phase with an amide catalyst having the formula

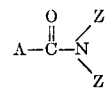

at a temperature between 80 and 150° C. where, in the above formulas, each R independently is H or alkyl having up to four carbon atoms; A is H or a hydrocarbon radical having up to six carbon atoms; and each Z independently is a hydrocarbon radical having up to six carbon atoms.

2. A process as defined in claim 1 wherein the temperature is between 80 and 130° C.

3. A process as defined in claim 1 wherein the temperature is between 100 and 120° C.

4. A process as defined is claim 1 wherein the 3-bromo-1-propyne is 3-bromo-1-propyne.

5. A process as defined in claim 1 wherein the volume ratio of amido catalyst to 3-bromo-1-propyne is greater than 1:2.

6. A process as defined in claim 1 wherein the volume ratio of amido catalyst to 3-bromo-1-propyne is between 1:2 and 5:1.

7. A process as defined in claim 1 wherein the isomerization occurs in the presence of a catalytic amount of a halide of an alkali metal, calcium, magnesium or copper.

8. A process as defined in claim 7 wherein the halide is chloride or bromide.

9. A process as defined in claim 7 wherein the isomerization occurs in the presence of a catalytic amount of sodium bromide and sodium chloride.

10. A process as defined in claim 7 wherein the amido catalyst is dimethylformamide, the 3-bromo-1-propyne is 3-bromo-1-propyne and the temperature is between 100 and 120° C.

References Cited

UNITED STATES PATENTS 3,364,271   1/1968   Gallant _____ 260—654

BERNARD HELFIN, Primary Examiner

J. A. BOSKA, Assistant Examiner

U.S. Cl. X.R.

424—351